July 28, 1925.  1,547,882
G. L. LAWRENCE, JR
MOLDED RUBBER WATER BOTTLE AND PROCESS OF MAKING SAME
Filed Aug. 23, 1923
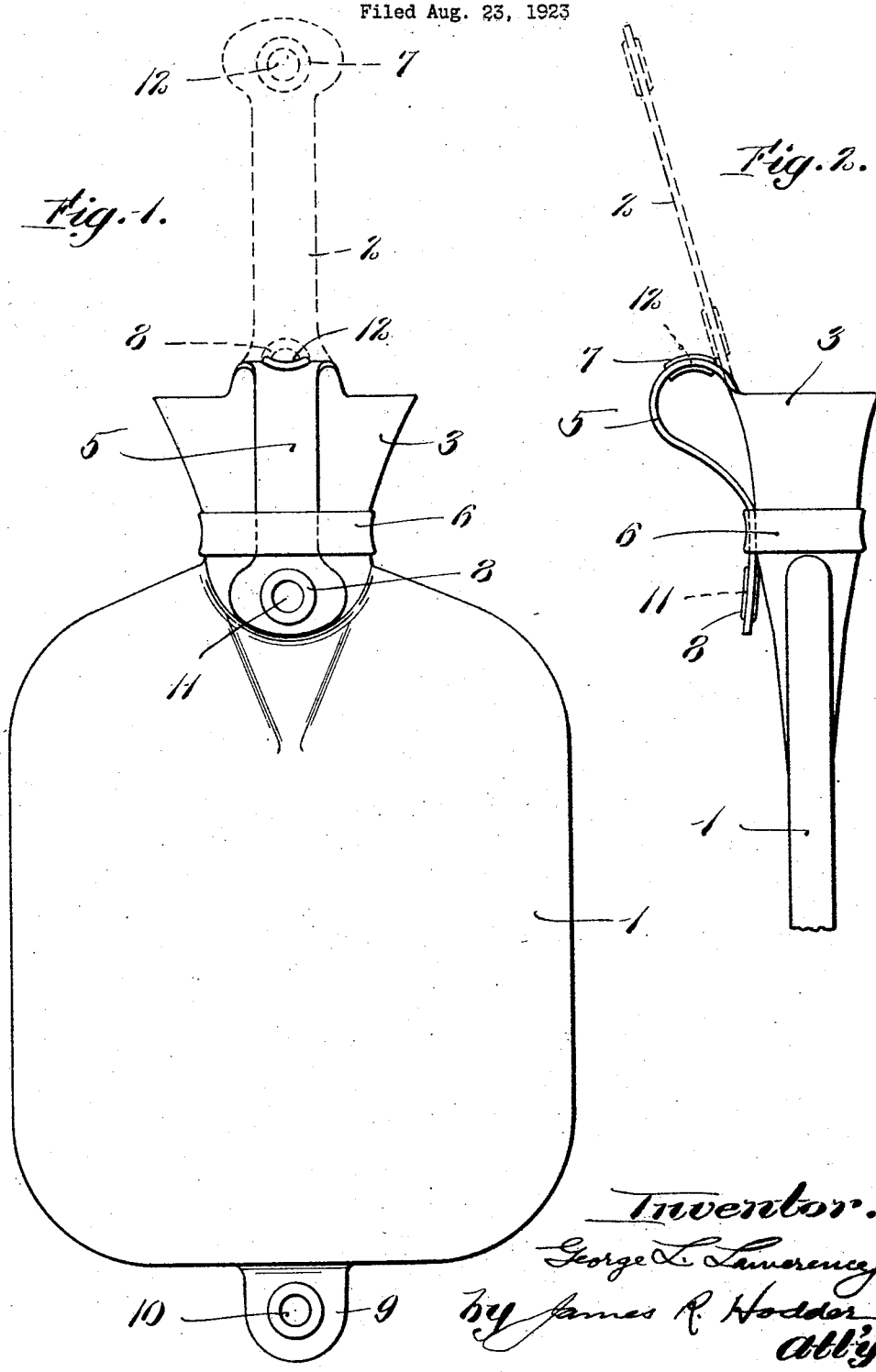

Patented July 28, 1925.

1,547,882

UNITED STATES PATENT OFFICE.

GEORGE L. LAWRENCE, JR., OF MELROSE, MASSACHUSETTS, ASSIGNOR TO TYER RUBBER COMPANY, OF ANDOVER, MASSACHUSETTS, A CORPORATION OF MASSACHUSETTS.

MOLDED RUBBER WATER BOTTLE AND PROCESS OF MAKING SAME.

Application filed August 23, 1923. Serial No. 658,966.

*To all whom it may concern:*

Be it known that I, GEORGE L. LAWRENCE, Jr., a citizen of the United States, and resident of Melrose, in the county of Middlesex and State of Massachusetts, have invented an Improvement in Molded Rubber Water Bottles and Processes of Making Same, of which the following description, in connection with the accompanying drawings, is a specification, like letters on the drawings representing like parts.

My present invention is an improved rubber water bottle and novel method of making same, wherein an integral handle is provided.

In the manufacture of hot water bottles as at present made, it is important and desirable to form seamless or molded water bottles or bags of rubber or rubber compounds. Heretofore it has been customary to apply, at either side of the neck of such rubber articles, a mass of rubber in order to enable the user to hold the neck of the bottle while filling the same without injury or danger from the pouring in of the hot or boiling water. It will be appreciated that the use of such articles necessitates the filling of the same while the water is hot or boiling, and upon holding the neck with the fingers, it rapidly becomes too heated to retain. Accordingly as illustrated by U. S. Patent No. 815,366, a mass of rubber at each side of the neck was provided to permit holding of the water bottle during the filling. This peculiar neck construction was desirable because of the difficulty of applying a handle by which the article could be held during filling. The prior practice required the applying of separate handles, securing and affixing the same, and this involved expense, labor, and difficulty of attachment, owing to the fact that rubber cannot well be sewed, stitched or similarly secured in a rigid and firm manner.

My present invention obviates the difficulties above noted, enables the production of a molded bottle or the like with a handle formed integrally therewith, and at the same time cheapens the process while resulting in a firm strong handle which will not tear out and which will be serviceable as long as the article itself.

In making the molded water bottle with integral handle, I carry out my invention by my novel process, which consists, briefly, in first forming the sides of the water bottle of suitable material, making one side with an extension, from which the handle is afterwards formed. The water bottle is molded into a complete article, and thereupon the extension for the handle is curved round into position and secured by a reinforcing band around the neck. Thus I produce in a simple, efficient and economical process, a molded water bottle with an integral handle, uniting the same independent of stitching, or the like, and in a secure and strong manner.

Referring to the drawings illustrating the invention,

Fig. 1 is a plan view of the complete molded water bottle and handle with the original handle extension shown in dotted lines;

Fig. 2 is a fragmentary side view of the same.

Referring to the drawings, 1 designates generally the completed hot water bag or bottle, made of any suitable rubber or rubber composition, and of standard and usual type of design. To one side of the bag, as herein illustrated, is cut or stamped, or added as a separate piece, and then molded onto the side or back, an extension 2, connected with the pouring flange portion 3 of the side. After the molding, this handle portion 2 is bent or doubled downwardly to form the curved handle 5, the extension 2 being of sufficient length to provide a handle opening and also to extend downwardly below the neck of the bottle, where it is secured by wire, a coating of cement, or the like, preferably together with an elastic band 6.

Preferably, in molding, a reinforcement is made for perforation as designated at 7 and a bottom extending ear 9 is also formed. These are afterwards perforated by forming recesses 10 and 11 to facilitate in clasping the article about the arm, leg or the like, as well as to suspend same when not in use.

I also prefer to form a ridge 13 on the handle 5 as an additional safeguard against the handle pulling free from its attachment with the neck, if secured by wire or the like.

Thus I have produced, by my novel process, a complete handled molded article, with the handle formed integrally therewith, attached and secured without separate operations incident to applying a separately formed and attached handle, and producing an article pleasing in appearance and efficient in use, with a handle which will and should, under ordinary usage, last as long as the article itself without danger of tearing free therefrom.

My invention is further described and defined in the form of claims as follows:

1. The improved process of making a molded handled hot water bottle or the like, which consists in forming one side or portion of the bottle with an integral extension from the pouring flange, molding the bottle, bending said extension into handle form, and attaching the lower portion of the handle thus bent, into engagement with the neck portion of the bottle.

2. The improved process of making a molded handled hot water bottle or the like, which consists in forming one side or portion of the bottle with an integral extension from the pouring flange, molding the bottle, bending said extension into handle form, and attaching the lower portion of the handle thus bent, into engagement with the neck portion of the bottle, and retaining the same by metallic or non-metallic binding.

3. An improved molded water bottle having, in combination, a body portion, a neck portion and a pouring flange formed integral with the body portion, an elongated handle formed integral with, and extending outwardly from, the pouring flange, and an attaching and reenforcing member for the handle portion surrounding the neck portion of the device.

In testimony whereof, I have signed my name to this specification.

GEORGE L. LAWRENCE, Jr.